US011143898B2

United States Patent
Li et al.

(10) Patent No.: US 11,143,898 B2
(45) Date of Patent: Oct. 12, 2021

(54) MULTICOLOR LIQUID CRYSTAL WRITING DEVICE

(71) Applicant: Wicue, Inc., Cupertino, CA (US)

(72) Inventors: Fenghua Li, Cupertino, CA (US); Rui Bao, Shenzhen (CN)

(73) Assignee: WICUE, INC., Cupertino, CA (US)

( * ) Notice: Subject to any disclaimer, the term of this patent is extended or adjusted under 35 U.S.C. 154(b) by 0 days.

(21) Appl. No.: 16/569,568

(22) Filed: Sep. 12, 2019

(65) Prior Publication Data

US 2020/0089036 A1 Mar. 19, 2020

Related U.S. Application Data

(60) Provisional application No. 62/730,800, filed on Sep. 13, 2018.

(51) Int. Cl.
| | | |
|---|---|---|
| *G02F 1/1333* | (2006.01) | |
| *G02F 1/1339* | (2006.01) | |
| *G02F 1/13357* | (2006.01) | |
| *G02F 1/1337* | (2006.01) | |
| *G02F 1/1335* | (2006.01) | |

(52) U.S. Cl.
CPC ........ *G02F 1/13338* (2013.01); *G02F 1/1339* (2013.01); *G02F 1/133365* (2013.01); *G02F 1/133514* (2013.01); *G02F 1/133617* (2013.01); *G02F 1/133711* (2013.01)

(58) Field of Classification Search
CPC .................................................. G02F 1/13338
See application file for complete search history.

(56) References Cited

U.S. PATENT DOCUMENTS

| | | | |
|---|---|---|---|
| 6,909,485 | B2 | 6/2005 | Yoon et al. |
| 6,982,432 | B2 | 1/2006 | Umemoto et al. |
| 10,228,599 | B1 | 3/2019 | Li |
| 2003/0071958 | A1 | 4/2003 | Wu et al. |
| 2004/0105614 | A1 | 6/2004 | Kobayashi et al. |
| 2004/0246431 | A1 | 12/2004 | Asada |
| 2005/0083564 | A1 | 4/2005 | Mallya et al. |
| 2006/0290691 | A1 | 12/2006 | Sato et al. |
| 2008/0266278 | A1 | 10/2008 | Lee et al. |
| 2009/0096942 | A1 | 4/2009 | Schneider et al. |

(Continued)

FOREIGN PATENT DOCUMENTS

JP 2001290135 10/2001

OTHER PUBLICATIONS

U.S. Appl. No. 15/569,741, "Non-Final Office Action", dated Oct. 30, 2019, 23 pages.

(Continued)

*Primary Examiner* — Edmond C Lau
(74) *Attorney, Agent, or Firm* — Weaver Austin Villeneuve & Sampson LLP

(57) ABSTRACT

Described are multicolor liquid crystal writing devices that exhibit high brightness and contrast and methods for manufacturing multicolor liquid crystal writing devices that exhibit high brightness and contrast. The liquid crystals used in the devices and methods described are photosensitized using UV light to modify a reflective character of the liquid crystals and different amounts, intensities, wavelengths, or exposure durations of UV light provide for different reflective colors.

12 Claims, 10 Drawing Sheets

(56) References Cited

U.S. PATENT DOCUMENTS

| | | |
|---|---|---|
| 2009/0290078 A1 | 11/2009 | Yang et al. |
| 2011/0035685 A1 | 2/2011 | Johanson et al. |
| 2012/0268420 A1 | 10/2012 | Marhefka et al. |
| 2013/0100074 A1 | 4/2013 | Chang et al. |
| 2014/0111470 A1 | 4/2014 | Wu et al. |
| 2014/0300606 A1 | 10/2014 | Nakada |
| 2014/0340589 A1 | 11/2014 | Montbach et al. |
| 2015/0124178 A1 | 5/2015 | Khan et al. |
| 2015/0193028 A1 | 7/2015 | Narita |
| 2016/0018681 A1* | 1/2016 | Chien .................. G02F 1/1391 349/33 |
| 2017/0176784 A1* | 6/2017 | Braganza ............ G02F 1/13718 |

OTHER PUBLICATIONS

U.S. Appl. No. 15/237,568, Non-Final Office Action dated Feb. 2, 2018, 12 pages.
U.S. Appl. No. 15/237,568, Notice of Allowance dated Oct. 25, 2018, 10 pages.
U.S. Appl. No. 15/569,741, Final Office Action dated Jul. 10, 2019, 19 pages.
U.S. Appl. No. 15/569,741, Non-Final Office Action dated Jan. 9, 2019, 16 pages.
International Application No. PCT/US2016/029882, International Preliminary Report on Patentability dated Nov. 9, 2017, 14 pages.
International Application No. PCT/US2016/029882, International Search Report and Written Opinion dated Aug. 19, 2016, 15 pages.
International Application No. PCT/US2017/038854, International Preliminary Report on Patentability dated Jan. 3, 2019, 11 pages.
International Application No. PCT/US2017/038854, International Search Report and Written Opinion dated Sep. 27, 2017, 12 pages.

* cited by examiner

MULTICOLOR LIQUID CRYSTAL WRITING DEVICE

CROSS REFERENCE TO RELATED APPLICATION

This application claims the benefit of and priority to U.S. Provisional Application No. 62/730,800, filed on Sep. 13, 2018, which is hereby incorporated by reference in its entirety.

FIELD

This invention is in the field of liquid crystal devices. This invention relates generally to liquid crystal display and writing devices.

BACKGROUND

Liquid crystals (LCs) have properties between conventional liquids and solid crystals. A liquid crystal flows like a liquid but molecules of the liquid crystal can be oriented in a way like a solid crystal. In different phases of the liquid crystal, the optical properties are different. Electronic display devices can include liquid crystal cells to display various types of information.

SUMMARY

Described herein are methods for manufacturing liquid crystal devices, such has liquid crystal display devices and liquid crystal writing devices. The disclosed liquid crystal devices advantageously exhibit multicolor reflection, meaning that different areas or regions of the liquid crystal devices reflect different wavelengths of light when the liquid crystals within the different areas or region are in a light reflecting configuration.

In a first aspect, methods for manufacturing a liquid crystal device are provided herein. An example method of this aspect comprises preparing a liquid crystal film including an uncured polymer and cholesteric liquid crystals comprising nematic liquid crystals and a photosensitive chiral dopant; and subjecting the liquid crystal film to an ultraviolet (UV) curing process using a first UV light exposure region and a second UV light exposure region. The first UV light exposure region and the second UV light exposure region may correspond to spatially separated regions of different UV light exposure across the liquid crystal film. The UV curing process may thus photosensitize the cholesteric liquid crystals and polymerize the uncured polymer to form cured polymer. During photosensitizing, the cholesteric liquid crystals of a first region of the liquid crystal film are subjected to the first UV light exposure region and photosensitized to have a first pitch. Similarly, the cholesteric liquid crystals of a second region of the liquid crystal film subjected to the second UV light exposure region are photosensitized to have a second pitch that is different from the first pitch.

Optionally, subjecting the liquid crystal film to the UV curing process may include photosensitizing the cholesteric liquid crystal includes by modifying a concentration ratio of different isomers of the photosensitive chiral dopant using exposure to UV light. In some embodiments, the photosensitive chiral dopant comprises a chiral azobenzene dopant and wherein subjecting the liquid crystal film to the UV curing process includes photosensitizing the cholesteric liquid crystal by modifying a concentration ratio of cis-isomers to trans-isomers of the chiral azobenzene dopant. In embodiments, exposing trans-isomers to UV radiation may result in photoisomerization of the molecules to form the cis-isomers. As described below, different isomeric forms of chiral azobenzene dopants may impart different amount of twist to a cholesteric liquid crystal including the chiral dopant and so by adjusting the ratio of the concentration of the different isomers, the twist can be controlled, which, in turn, impacts the optical properties of the liquid crystals.

To achieve different optical properties of different regions or areas of liquid crystals in a liquid crystal film, UV light characteristics may differ between different UV light exposure regions. For example, UV light intensities may differ between the first UV light exposure region and the second UV light exposure region. Optionally, UV light wavelengths may differ between the first UV light exposure region and the second UV light exposure region. Optionally, UV light exposure durations differ between the first UV light exposure region and the second UV light exposure region. Combinations of different intensities, wavelengths, or exposure durations are also possible from region to region.

During the curing process, the cholesteric liquid crystals may physically separate from the cured polymer to create individual droplets of liquid crystals suspended in or supported by a polymer matrix. Such a configuration may allow the cholesteric liquid crystal to switch from a light scattering state to a light reflective state in response to applied mechanical pressure without an electric field applied across the liquid crystal film (e.g., between the conductive layers). Such light scattering and light reflective states may be stable, and liquid crystal employing such a configuration may be referred to herein as a bistable configuration. In some cases, the UV curing process may form one or more liquid crystal layers of the cholesteric liquid crystals and one or more polymer layers of the cured polymer. Such layers may be in an alternating or sandwich configuration, such as where the liquid crystal layer is between separate polymer layers or where a polymer layer is between separate liquid crystal layers.

Advantageously liquid crystals subjected to different amounts, intensities, wavelengths, or durations of UV light exposure may exhibit different light reflective characteristics. For example, the light reflective state of the first liquid crystal region may correspond to reflection of light of a first color, and the light reflective state of the second liquid crystal region may correspond to reflection of light of a second color that is different from the first color.

Although the methods of this aspect have been described with reference to only two separate UV light exposure regions and two separate regions of the liquid crystal film, any desirable number of regions may be implemented, such as from 2 to 100, or more. Optionally subjecting the liquid crystal film to the UV curing process includes using the first UV light exposure region, the second UV light exposure region, and one or more additional UV light exposure regions. Optionally, the first UV light exposure region, the second UV light exposure region, and the one or more additional UV light exposure regions correspond to spatially separated regions of different UV light exposure across the liquid crystal film. The liquid crystal film may have any suitable thickness, such as from about 1 µm to about 100 µm, or thinner or thicker than this. For example, the liquid crystal film may have a thickness of from about 5 µm to about 10 µm, such as about 7 µm.

In some embodiments, additional materials may be included in the liquid crystal film to enhance the stability of the cholesteric liquid crystals, such as to limit or minimize changes to the pitch of the liquid crystals by exposure to additional UV light after the UV curing process. Since UV light can mediate a conformation change between isomers of a chiral dopant, limiting exposure to UV light may be advantageous. For example, a UV filter may optionally be placed over the liquid crystal film, such as a UV light absorbing filter. In some cases, forming a cross-linked polymeric network may help to stabilize the photosensitied chiral dopant and limit the effect of additional UV light exposure. In some cases, the liquid crystal film may include multifunctional monomers that form a cross-linked polymer network when subjected to the UV curing process.

As described below, the liquid crystal devices made by the methods of this aspect may exhibit a change in the optical properties of the cholesteric liquid crystals when a pressure or force is applied. The pressure or force may induce the cholesteric liquid crystals to adopt a configuration where they reflect visible light, with the wavelength dependent upon the pitch of the cholesteric liquid crystals. The pitch may be a function of the concentration of the chiral dopant and the concentration ratio of different isomeric forms of the chiral dopant. To "reset" or "erase" or "restore" the liquid crystals to a scattering or transparent configuration, an electric field may be applied to at least temporarily align the liquid crystals. As such, methods of this aspect may further comprise placing a first conductive layer above the liquid crystal film and placing a second conductive layer below of the liquid crystal film. Any suitable conductive layers may be used, though transparent electrodes may be particularly advantageous. Example transparent electrodes may include conducting transparent oxide or transparent conducting polymers. Conducting layers may have any suitable thickness, such as from about 10 nm to about 100 μm, or thinner or thicker than this. For example, the conducting layers may each independently have a thickness of from about 50 nm to about 500 nm, such as about 100 nm.

Use of transparent conducting polymers, however, may have some limitations. In some cases, components of the liquid crystal film may unfavorable interact or react with components of a transparent conducting polymer layer. Accordingly, it may be desirable to limit direct contact between a conducting layer and the liquid crystal film. In some embodiments, a method of this aspect may further comprise placing a first passivation layer above the liquid crystal film, such as a first passivation layer between the liquid crystal film and the first conductive layer. Optionally, a method of this aspect may further comprise placing a second passivation layer below the liquid crystal film, such as a second passivation layer between the liquid crystal film and the second conductive layer. Passivation layers may have any suitable thickness, such as from about 10 nm to about 100 μm, or thinner or thicker than this. For example, the passivation layers may each independently have a thickness of from about 50 nm to about 500 nm, such as about 100 nm.

In embodiments, a method of this aspect may further comprise placing a substrate below the liquid crystal film. Example substrates may include polymeric substrates, glass substrates, inorganic substrates, etc. In some embodiments, the substrate may be transparent or may exhibit a black or dark color, which may be advantageous for use in liquid crystal writing devices, such as to provide good contrast with the reflective state of liquid crystals upon application of a pressure or force. Substrates may have any suitable thickness, such as from about 1 μm to about 1 mm, or thinner or thicker than this. For example, a substrate may have a thickness of from about 50 μm to about 500 μm, such as about 100 μm.

A variety of cholesteric liquid crystal configurations may be employed in the methods and devices described herein. For example, the cholesteric liquid crystals may comprise nematic liquid crystals and a photosensitive chiral dopant. Optionally, the nematic liquid crystals comprise from 20% by weight to 50% by weight of the liquid crystal film. Example nematic liquid crystals include, but are not limited to, SL-79 (HCCH), SL-83 (HCCH), E44 (Merck), BL038 (Merck), BP1 (HCCH), MLC-6080 (Merck), JC-BP07N (JNC), TEB300 (Slichem), or any combination of these.

In some embodiments, the photosensitive chiral dopant comprises one or more chiral azobenzene dopants. Azobenzene dopants may be particularly advantageous because these molecules can adopt different isomeric configurations, which can each impact the optical properties of the liquid crystal in different ways. Example chiral azobenzene dopant include, but are not limited to:

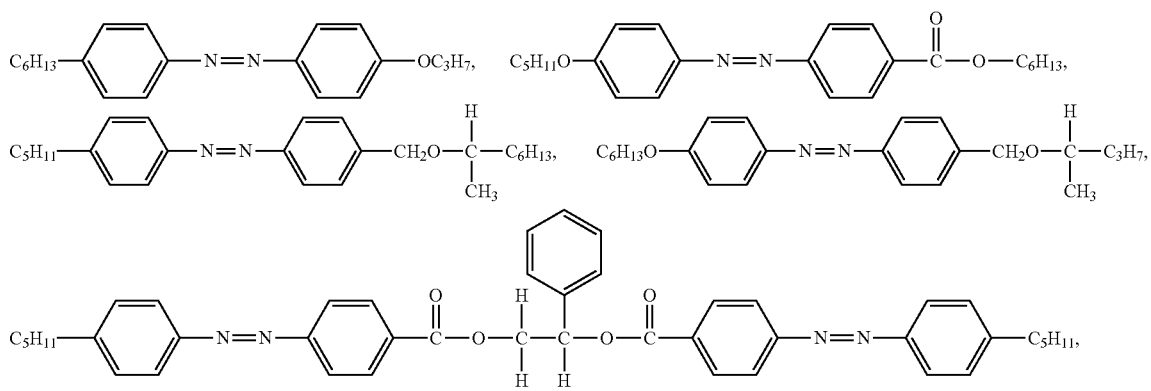

or any combination of the above. Optionally, the photosensitive chiral dopant comprises from 0.1% by weight to 30% by weight of the liquid crystal film.

Optionally, the cholesteric liquid crystal and/or the liquid crystal film may further comprise a chiral dopant, which may be different from the photosensitive chiral dopant and optionally not photosensitive. In some embodiments, the chiral dopant may comprises from 0.1% by weight to 15% by weight of the liquid crystal film. Example chiral dopants includes, but are not limited to, C15, CB15, R-811, S-811, R-1011, S-1011, R-2011, S-2011, R-5011, S-5011, ZLI-4572 (Merck), ISO-(6OBA)$_2$, or any combination of these.

A variety of polymers or prepolymers are useful with the methods and devices described herein. For example, useful polymers and prepolymers include, but are not limited to, Norland NOA 65, pentaerythritol triacrylate, trimethylolpropane triacrylate, trimethylolpropane triacrylate, trimethylolpropane ethoxylate triacrylate, glycerine propoxylate triacrylate, glycerine ethoxylate triacrylate, 1,10-bis(acryloyloxy)decane, 1,9-bis(acryloyloxy)nonane, isodecyl methacrylate, 2,2-dimethoxy-1,2-diphenylethan-1-one, a UV curable epoxy resin, a UV curable acrylate adhesive, UV-8006 (Shenzhen Guangxinyi Company), UV-8116 (Shenzhen Guangxinyi Company), UV-9001 (Shenzhen Guangxinyi Company), UV-9003 (Shenzhen Guangxinyi Company) or any combination of these. Optionally, the prepolymer or cured polymer comprises from 5% by weight to 60% by weight of the liquid crystal film.

In embodiments, methods of this aspect may use roll-to-roll processing techniques. For example, in some embodiments, preparing the liquid crystal film includes applying one or more components of the liquid crystal film using a roll coating technique. Optionally, subjecting the liquid crystal film to the UV curing process occurs during roll to roll processing of the liquid crystal film. The methods of this aspect may advantageously be useful for manufacturing any of the liquid crystal devices described herein.

In another aspect, liquid crystal devices are provided. In some examples, a liquid crystal device comprises a first conductive layer; a second conductive layer; and a liquid crystal film between the first conductive layer and the second conductive layer. Useful liquid crystal films for the disclosed liquid crystal devices optionally comprise a polymer layer, and a liquid crystal layer including cholesteric liquid crystals, the cholesteric liquid crystals comprising nematic liquid crystals and a photosensitive chiral dopant. The liquid crystal layer may optionally include a first region and a second region, with the first region and the second region corresponding to transversely separated areas across the liquid crystal layer (e.g., areas perpendicular to a thickness of the liquid crystal layer). The concentration ratios of different isomers of the photosensitive chiral dopants in the first region may be different from that in the second region. In this way, a single chiral dopant may be used and have the same overall concentration from region to region, but the different isomeric configurations can impact the optical properties and allow the optical properties of the liquid crystal to vary from region to region. Optionally, the photosensitive chiral dopant comprises a chiral azobenzene dopant and the concentration ratio correspond to concentration ratios of cis-isomers to trans-isomers of the chiral azobenzene dopant.

In embodiments, the cholesteric liquid crystals in the first region of the liquid crystal layer may exhibit a reflective state of a first color, and the cholesteric liquid crystals in the second region of the liquid crystal layer may exhibit a reflective state of a second color, different from the first color. In embodiments, the cholesteric liquid crystals in the liquid crystal layer exhibit a reflective state and a scattering state. The reflective state may be stable in the absence of an electric field applied between the first conductive layer and the second conductive layer, and the scattering state may be stable in the absence of an electric field applied between the first conductive layer and the second conductive layer. In other words, the liquid crystal layer may have a bistable configuration. Advantageously, the cholesteric liquid crystals in a light scattering state in the liquid crystal layer may change to a light reflective state in response to applied mechanical pressure. In embodiments, the cholesteric liquid crystals in a light reflective state in the liquid crystal layer may change to a light scattering state or transparent state in response to an electric field applied between the first conductive layer and the second conductive layer.

Other components may also be included in the liquid crystal devices described herein. For example, in embodiments, a liquid crystal device may further comprise a passivation film between the first conductive layer and the liquid crystal layer and/or between the second conductive layer and the liquid crystal layer. Use of passivation layers may be useful for limiting the interaction between the liquid crystal film and a conductive layer adjacent to the liquid crystal film.

In some embodiments, a liquid crystal device is manufacturing using the methods described herein.

Figure 1:
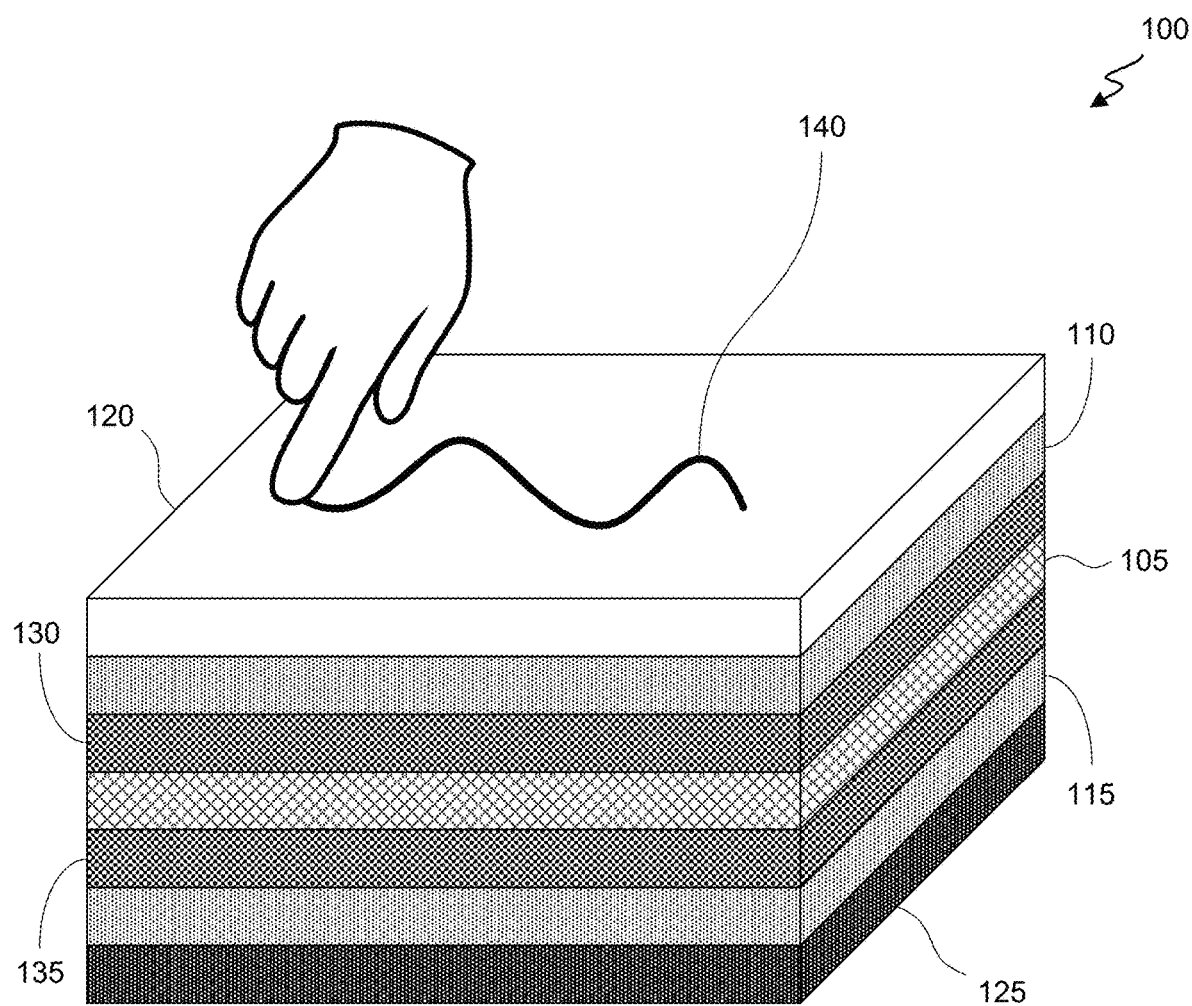
FIG. 1 provides a schematic overview of an example liquid crystal device in accordance with some embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Described herein are liquid crystal displays and writing devices that exhibit high brightness and contrast and methods for manufacturing liquid crystal displays and writing devices that exhibit high brightness and contrast. The liquid crystal displays and writing devices optionally include first and second conductive layers and a liquid crystal film between the conductive layers. The liquid crystal film can include liquid crystal layers and polymer layers, constructed such that the liquid crystal film exhibits a bistable configuration, where different states of liquid crystals (e.g., a focal conic state and a planar state) within the film are stable in the absence of an applied electric field. Further details regarding bistable liquid crystal writing devices may be found in U.S. patent application Ser. No. 15/237,568, filed on Aug. 15, 2016, now U.S. Pat. No. 10,228,599, issued on Mar. 12, 2019, which is hereby incorporated by reference in its entirety.

Each of the different stable states can possess different optical characteristics. For example, the focal conic state may exhibit a light scattering characteristic and the planar state may exhibit a light reflecting characteristic. When placed over a background, the focal conic state may have an appearance similar to a background behind the liquid crystal film. The planar state, however, may reflect light of a particular color (i.e., wavelength or wavelength range), and have an appearance of a bright color, for example. By applying a force or pressure to the liquid crystal displays and writing devices, the liquid crystal film can transition from the focal conic state to the planar state. Since the planar state is stable, a reflective appearance may be maintained where the pressure or force was applied, allowing for a user to write or draw on the liquid crystal display or writing device. Further, by applying a potential between the conductive layers, the liquid crystals can be exposed to an electric field and have their orientation actively adjusted (e.g., to a perpendicular state), which may be transparent or may scatter light, similar to the focal conic state. After the potential is removed, the liquid crystals can relax back to the stable focal conic state.

A cholesteric liquid crystal can be formed from liquid crystal materials possessing inherent chirality, like cholesterols, or by mixing chiral molecules (dopants) into nematic liquid crystals. The chirality of the cholesteric liquid crystals makes the liquid crystal molecules align with one another at a certain angle that yields a helical microstructure. The pitch length of a cholesteric liquid crystal helix is defined as the unit length for a complete rotation. The central wavelength of the reflection of a cholesteric liquid crystal is given by:

$$\lambda = \left(\frac{n_e + n_o}{2}\right) P$$

where $n_e$ is the extraordinary refractive index, $n_o$ is the ordinary refractive index, and P is the pitch. In the case of a cholesteric liquid crystal formed by doping chiral dopant into a nematic liquid crystal, P is controlled by the helical twist power (HTP) of the chiral dopant, which is a function of the concentration of the chiral dopant.

In contrast to other liquid crystal displays and writing devices, the liquid crystal displays and writing devices (liquid crystal devices) described herein can exhibit multiple different reflective colors. By placing cholesteric liquid crystals having different pitch lengths across different areas of the liquid crystal film or in different regions of the liquid crystal film, the reflective color may vary as a function of position in the liquid crystal devices. The technique advantageously applied herein for achieving different pitch lengths includes using a cholesteric liquid crystals comprising nematic liquid crystals and a photosensitive chiral dopant and exposing the photosensitive chiral dopant to ultraviolet light to adjust the pitch length of the cholesteric liquid crystals.

Example photosensitive chiral dopants include, but are not limited to, chiral azobenzene dopants, which may have a general molecular structure of:

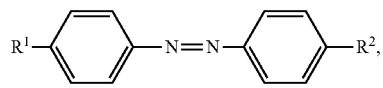

where $R^1$ and $R^2$ are independently the same or different side groups. In some examples, at least one of $R^1$ or $R^2$ includes a stereocenter, which can provide chirality. Azobenzene compounds, like the chiral azobenzene dopants used herein, can exist in two isomeric forms, a cis configuration and a trans configuration. Conversion between the two configurations can be mediated by exposure to light, such as UV light. In the cis configuration, the benzene rings are on the same side of the double bond, while in the trans configuration, the benzene rings are on opposite sides of the double bond:

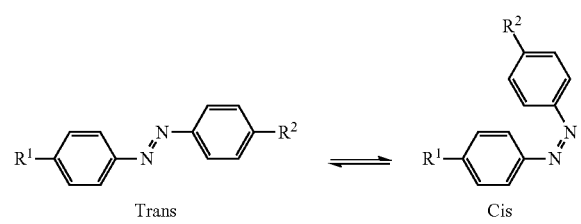

Trans                    Cis

The different isomers may modify the HTP differently, so by adjusting the relative concentrations of the different isomeric forms of the photosensitive chiral dopant, the HTP and pitch length can be controlled. By exposing the photosensitive chiral dopant to a particular amount, intensity, wavelength, or duration of ultraviolet light, the pitch length of cholesteric liquid crystals in different regions of the liquid crystal devices can be controlled, allowing the liquid crystals different regions to exhibit different reflective colors. In some cases, multiple different liquid crystals with different pitch lengths may be used in the same region to achieve a particular reflective color combination configuration, such as a combination of a blue reflective color and a green reflective color.

Liquid crystal devices described here may optionally employ liquid crystal films formulated with chiral azobenzene dopants, chiral dopants, oligomers, monomers, and photoinitiators. The liquid crystal films may be cured using an ultraviolet (UV) curing process, which may polymerize the prepolymer components (oligomers, monomers, and/or photoinitiators) and isomerize portions of the chiral azobenzene dopants. As more of the chiral azobenzene dopants are photoisomerized from the trans-isomer to the cis-isomer, the reflection wavelength of the cholesteric liquid crystals may red-shift. By curing different areas of the liquid crystal film with different amounts, intensities, or wavelengths, or durations of UV light, the different areas can undergo different red-shift amounts and thus the different areas can exhibit different colors upon application of pressure or force.

Liquid Crystal Writing Devices

FIG. 1 provides a schematic overview of an example liquid crystal device 100, which may correspond to a liquid crystal display or liquid crystal writing device. Liquid crystal device 100 includes a liquid crystal film 105, first conductive layer 110, and second conductive layer 115. More detail about liquid crystal films, such as liquid crystal film 105, is provided below, but liquid crystal film 105 generally comprises cholesteric liquid crystals and one or more polymers, with the cholesteric liquid crystals exhibiting a bistable configuration (a stable reflective configuration and a stable scattering or transmissive configuration). First conductive layer 110 and second conductive layer 115 may comprise transparent conductive materials, such as a transparent conductive oxide or a transparent conductive polymers. Exemplary transparent conductive materials include, but are not limited to, indium tin oxide, indium zinc oxide, indium gallium zinc oxide, poly(3,4-ethylenedioxythiophene) (PEDOT), or PEDOT doped with poly(styrene sulfonate) (PSS) (PEDOT:PSS). Other materials may be useful for conductive layers, such as thin metal films (e.g., comprising silver, copper, or other metals) or carbon nanotube- or graphene-based films. In some cases, second conductive layer 115 is not transparent and exhibits a background color (e.g., a dark color to mimic a background of a blackboard).

Liquid crystal device 100 may also comprise other layers, including one or more substrate layers 120 and 125 and, optionally, passivation layers 130 and 135. Substrate layers 120 and 125 may optionally comprise multiple layers. Example substrates may include polymer films, such as polyethylene terephthalate (PET), polyimide (PI), polypropylene (PP), or the like, glass, quartz, or any other suitable substrate material. Optionally, substrate 120 and/or 125 may be transparent. Optionally, substrate 125 may be non-transparent and may exhibit a background color (e.g., a dark color to mimic a background of a blackboard). Use of a dark background color may be advantageous to provide for high contrast with reflective liquid crystal states. Passivation layers 125 and 130 may be inert, nonreactive, and/or insulating layers, and may serve to limit contact between liquid crystal film 105 and first conductive layer 110 and second conductive layer 115, so as to avoid unnecessary or unwanted chemical reactions between the first and second conductive layers 110 and 115 and components of liquid crystal film 105, such as polymer components or liquid crystal components. Use of a passivation layer may be particularly desirable when first conductive layer 110 and/or second conductive layer 115 comprises a conductive polymer. Example materials for passivation layers 125 and 130 include, but are not limited to, polymer materials (e.g., PET, PI) and dielectric materials, like silicon dioxide or silicon nitride. Passivation layers 125 and 130 may also serve to encapsulate the liquid crystal film 105.

As shown in FIG. 1, a finger or other writing implement (e.g., a stylus) can be used to apply a pressure to the top surface of the liquid crystal device 100 to provide for a visible trace 140. For ease of illustration, trace 140 is shown in FIG. 1 in black, but it will be appreciated that other colors may be achieved.

Figure 2A:
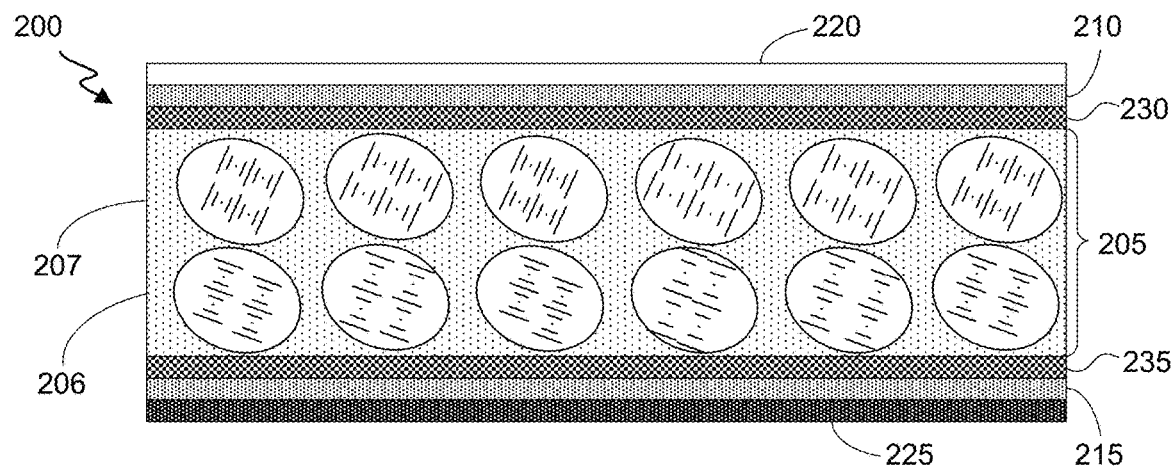
FIG. 2A, FIG. 2B, and FIG. 2C provide schematic cross-sectional views of an example liquid crystal device in accordance with some embodiments.
Figure 2B:
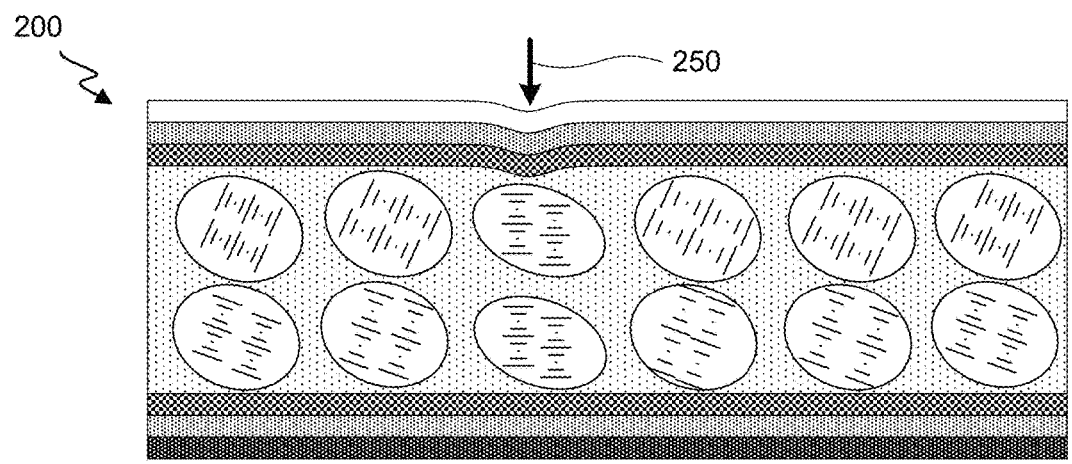
Figure 2C:
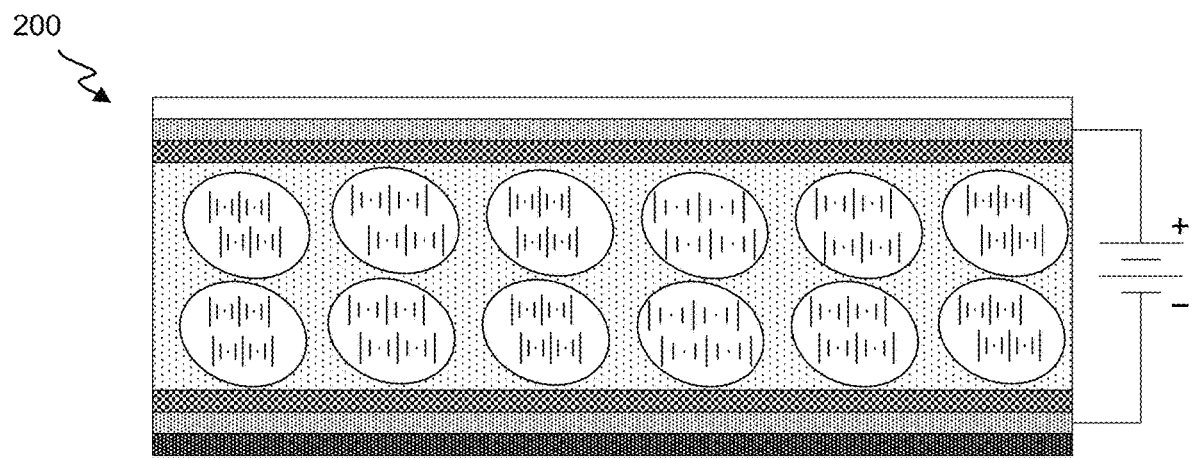
Figure 3A:
FIG. 3A and FIG. 3B provide schematic top or face views of an example liquid crystal device in accordance with some embodiments.

FIGS. 2A, 2B, and 2C provide more detail regarding the application of pressure to a liquid crystal device, and show cross sectional schematic views of an example liquid crystal device 200. Liquid crystal device 200 is constructed similar to liquid crystal device 100 shown in FIG. 1, and includes a liquid crystal film 205, first conductive layer 210, second conductive layer 215, substrates 220 and 225, and passivation layers 230 and 235. Liquid crystal film 205 is shown in an expanded schematic view to illustrate liquid crystal regions 206 and polymer regions 207. In embodiments, liquid crystal film is made by applying a mixture of a cholesteric liquid crystal and a prepolymer, and curing the prepolymer by exposure to ultraviolet (UV) light. The liquid crystal and cured polymer separate from one another, forming liquid crystal regions 206 surrounded by polymer regions 207. Liquid crystal regions 206 may include some amount of polymer or prepolymer but are primarily (i.e., more than 50%) liquid crystal. Similarly, polymer regions 207 may include some amount of liquid crystals but are primarily (i.e., more than 50%) cured polymer. The helical structure of the liquid crystals in liquid crystal region 206 are schematically illustrated to generally show the orientation of the liquid crystal domains in the liquid crystal region 206. In FIG. 2A, the liquid crystals in liquid crystal region 206 are depicted as having a stable focal conic configuration, meaning that they are effective for scattering light, allowing the liquid crystal device 200 to be transparent or have the appearance of substrate 225 or second conductive layer 215, which may have a black or dark color. FIG. 3A shows a top or face view of liquid crystal device 200, showing the black or dark color background.

Figure 3B:
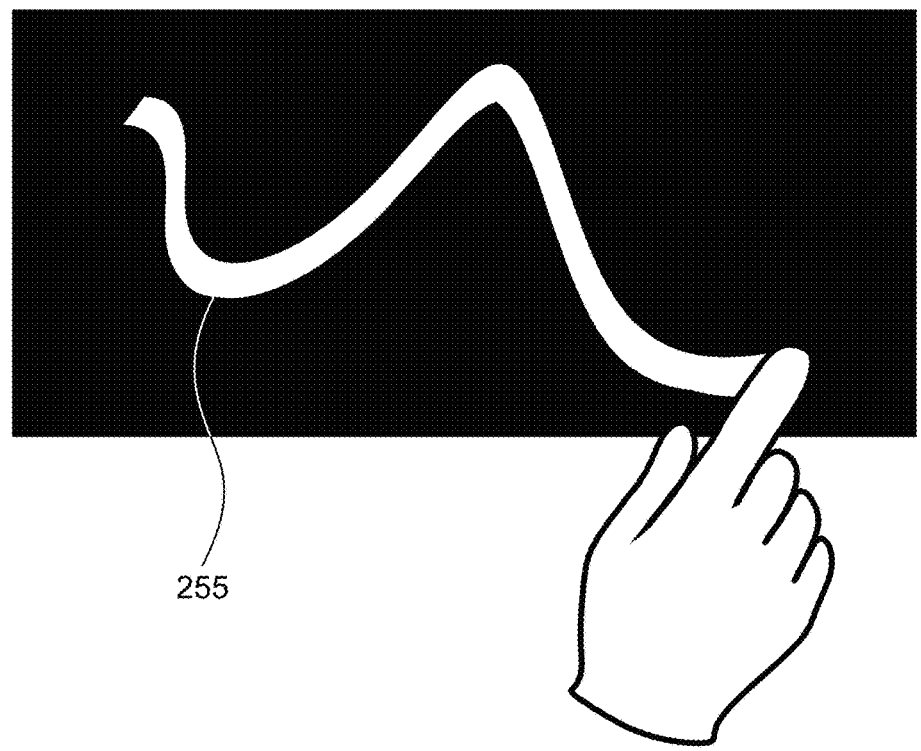

FIG. 2B shows liquid crystal device 200 where a force 250 is applied to the surface. Force 250 may be representative of a writing implement (e.g., a finger or stylus) applying pressure to the surface. The orientation of the liquid crystals in liquid crystal regions 206 beneath force 250 change due to application of the force 250, and transition from the focal conic configuration to a stable parallel configuration, for example. As noted above, the parallel configuration may be reflective, allowing a bright mark 255 of a particular color to appear on the liquid crystal device 200 when viewed from above, contrasting with the black or dark color background. FIG. 3B shows a top or face view of liquid crystal device 200, showing the bright mark 255 appearing over the black or dark color background. Mark 255 is shown in FIG. 3B as having a white color, but it will be appreciated that any desirable color may be achieved by controlling the pitch of the liquid crystals in liquid crystal regions 206.

FIG. 2C shows liquid crystal device 200 where a potential is applied between first conductive layer 210 and second conductive layer 215. The potential can subject the liquid crystal film 205 to an electric field, causing the orientation of liquid crystals in liquid crystal regions 206 to change, transitioning to a perpendicular configuration, for example. The perpendicular configuration may be transparent, and thus the application of the potential can be useful for erasing or removing marks made by application of force 250. The perpendicular configuration may not be an energy stable configuration, so once the potential is removed, the orientation of the liquid crystals may return to the focal conic configuration, as depicted in FIG. 2A.

Multicolor Liquid Crystal Writing Devices

Figure 4A:
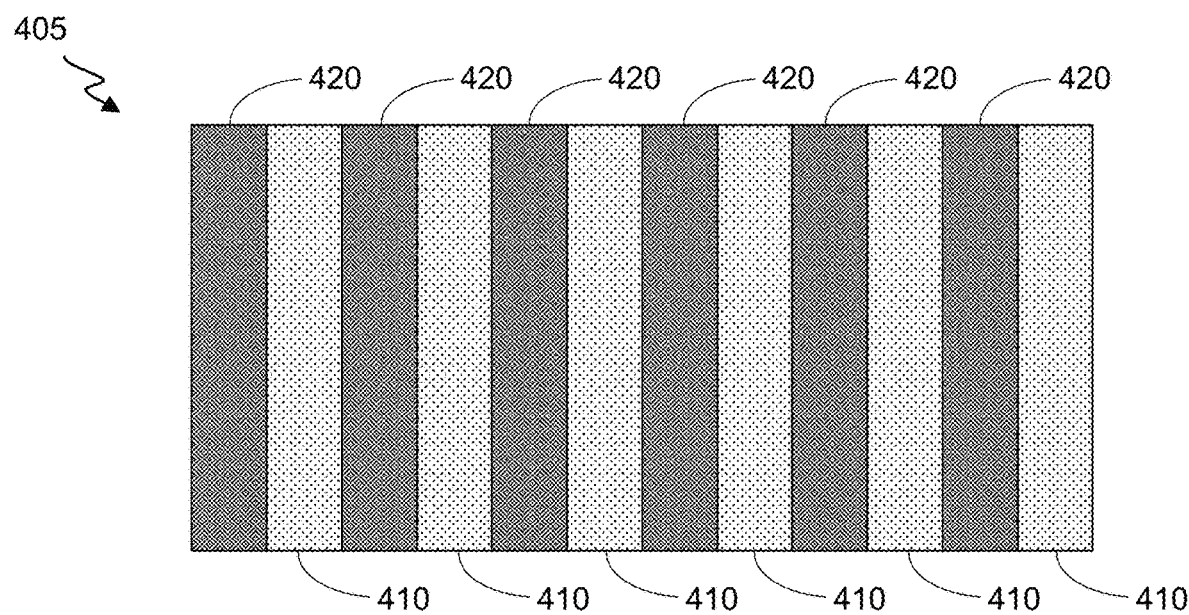
FIG. 4A provides a schematic illustration of an example liquid crystal film having a striped configuration in accordance with some embodiments.

Mark 255 is shown in FIG. 3B as having a white color, but it will be appreciated that any desirable color may be achieved by controlling the pitch of the liquid crystals in liquid crystal regions 206. FIG. 4A provides a schematic face or top view of different areas 410 and 420 of a liquid crystal layer 405 in a liquid crystal device 400, with different shading representing different pitch length or reflective color of liquid crystals, when in an actively reflecting configuration, in areas 410 and 420. For example, liquid crystals in area 410 may exhibit a red or pink reflective color when in their actively reflecting configuration and liquid crystals in area 420 may exhibit a blue or green reflective color when in their active reflecting configuration. Other color combinations are possible, and use of any number of different reflective colors, such as from 2 to 20 or more (e.g., up to 100), are possible. In FIG. 4A, the different areas 410 and 420 are provided in alternating arrangement.

Figure 4B:
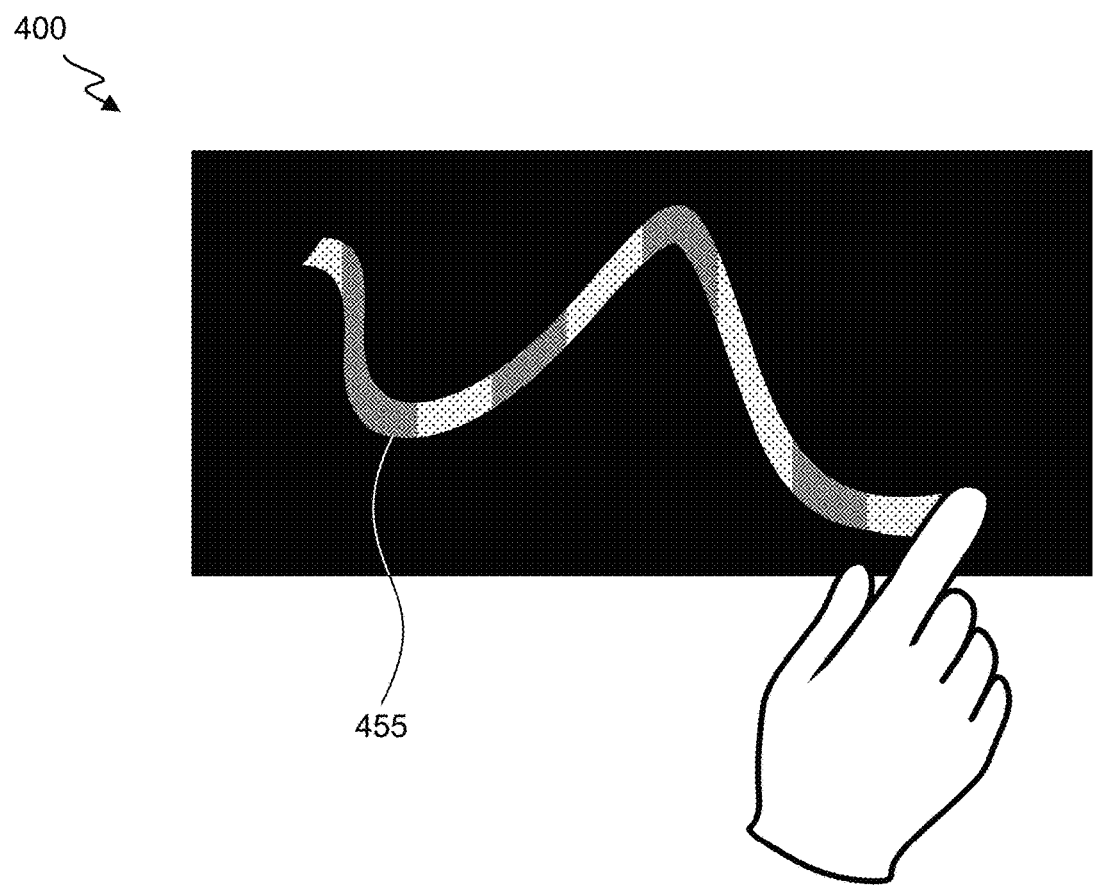
FIG. 4B provides a schematic top or face view of an example two-color liquid crystal device employing the liquid crystal film shown in FIG. 4A.

FIG. 4B shows a top or face view of liquid crystal device 400, showing the appearance of bright mark 455 over the black or dark color background due to application of pressure or force to the surface of liquid crystal device 400. Mark 455 is shown in FIG. 4B as having a series of reflective colors, matching the position of areas 410 and 420 shown in FIG. 4A.

Figure 5A:
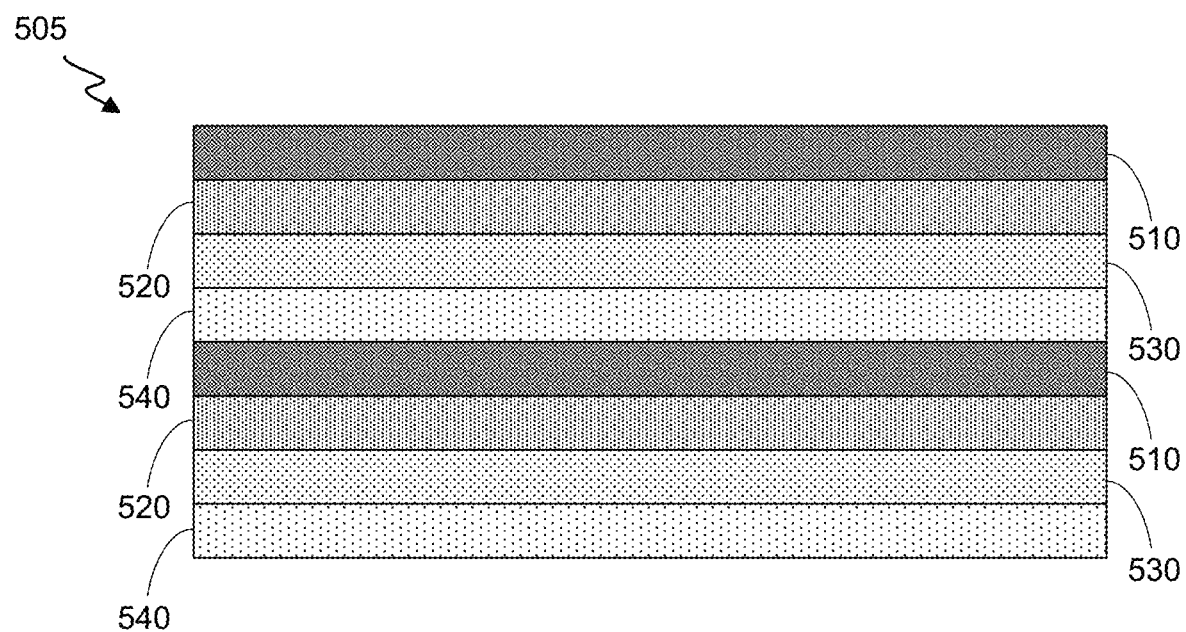
FIG. 5A provides a schematic illustration of an example liquid crystal film having a striped configuration in accordance with some embodiments.
Figure 5B:
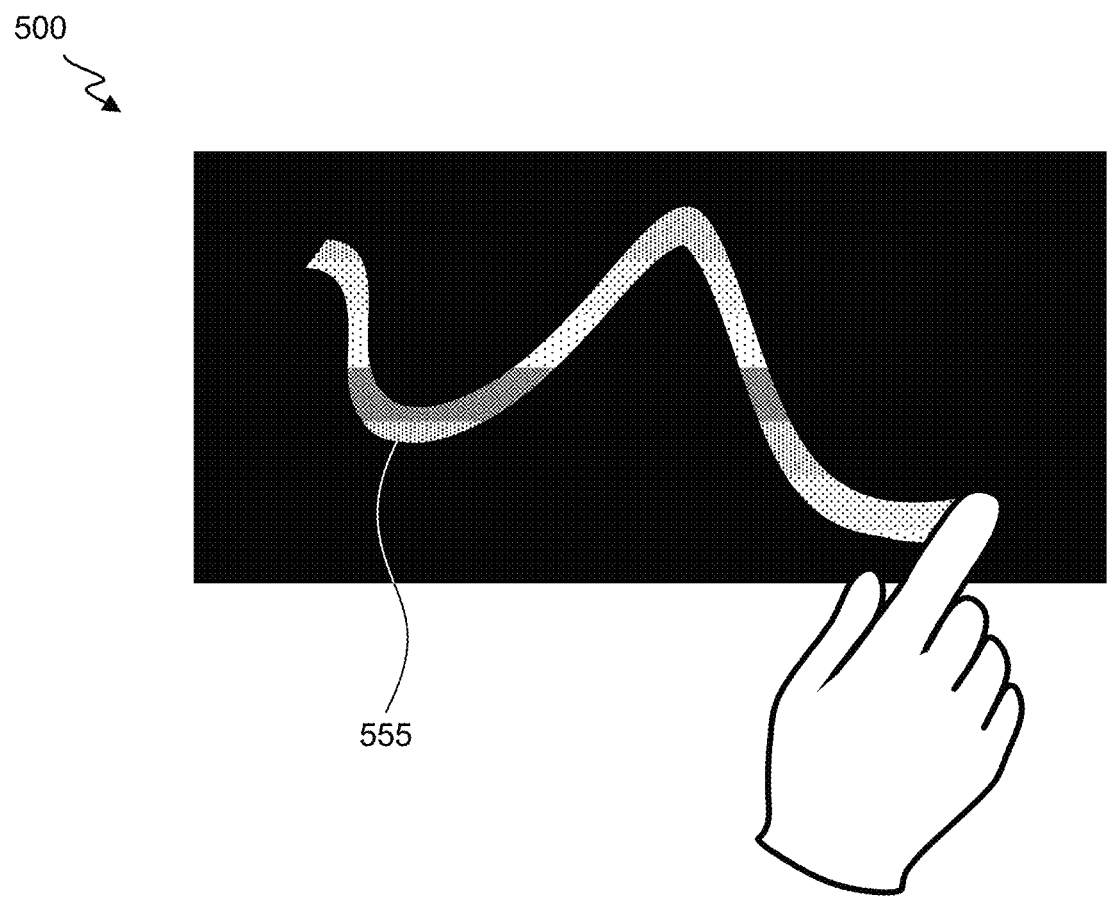
FIG. 5B provides a schematic top or face view of an example four-color liquid crystal device employing the liquid crystal film shown in FIG. 5A.

Any desirable number of reflective colors and arrangement of areas are contemplated according to the present disclosure. In FIG. 4A, areas 410 and 420 are shown as horizontally arranged alternating vertical stripes. As another example, vertically arranged horizontal stripes can also be employed, as shown in FIGS. 5A and 5B. FIG. 5A provides a schematic face or top view of different areas 510, 520, 530, and 540 of a liquid crystal layer 505 in a liquid crystal device 500, with different shading representing different pitch length or reflective color of liquid crystals, when in an actively reflecting configuration, in areas 510, 520, 530, and 540. FIG. 5B shows a top or face view of liquid crystal device 500, showing the appearance of bright mark 555 over the black or dark color background due to application of pressure or force to the surface of liquid crystal device 500. Mark 555 is shown in FIG. 5B as having a series of different reflective colors, matching the position of areas 510, 520, 530, and 540 shown in FIG. 5A. Here, four reflective colors may be used, such as red for area 510, orange for area 520, green for area 530, and blue for area 540, for example.

Use of vertically arranged horizontal stripes or horizontally arranged vertical stripes may be advantageous for manufacturing multicolor liquid crystal writing devices, as striped configurations may be easily achieved using roll-to-roll processing methods, as described below. Other geometrical or arbitrary areas for different reflective colors may be used, however.

Figure 6A:
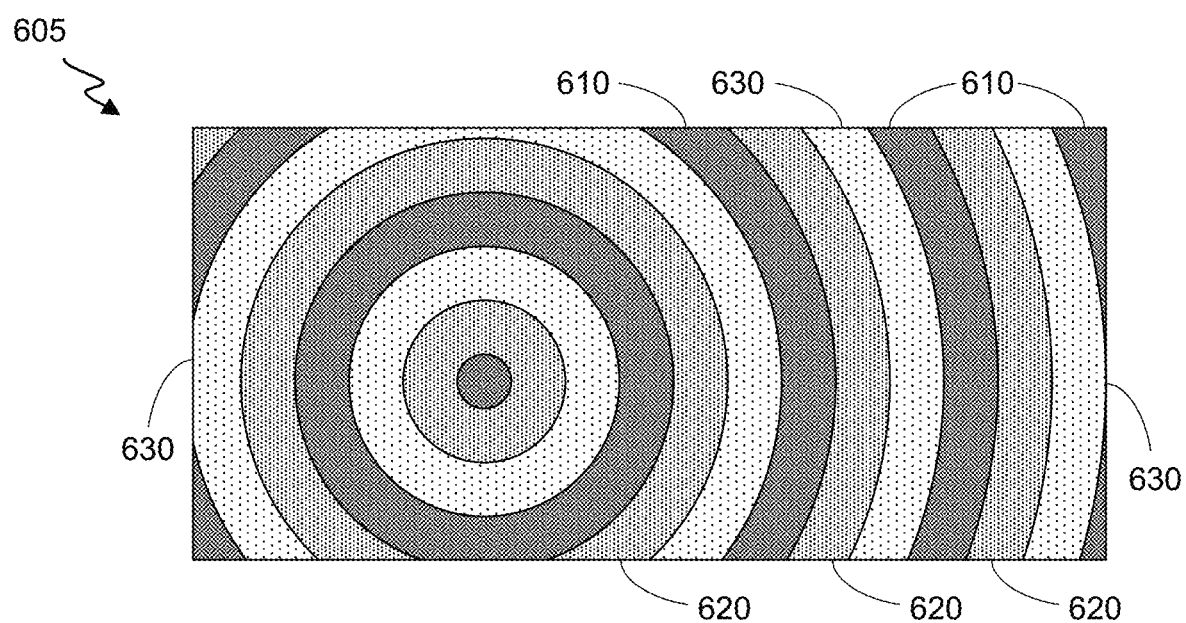
FIG. 6A provides a schematic illustration of an example liquid crystal film having a circular banded configuration in accordance with some embodiments.
Figure 6B:
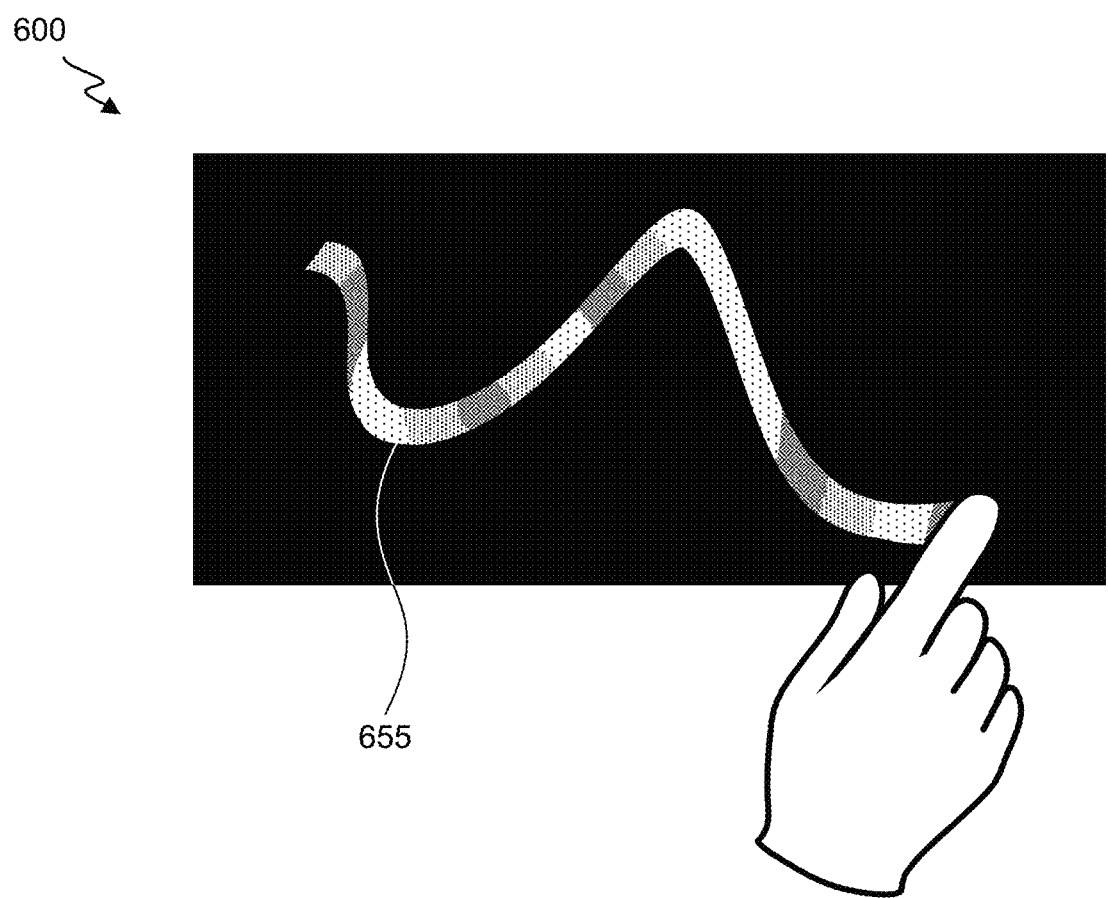
FIG. 6B provides a schematic top or face view of an example three-color liquid crystal device employing the liquid crystal film shown in FIG. 6A.

For example, stripes of other orientations may be used. FIG. 6A provides a schematic face or top view of different areas 610, 620, and 630, shown as concentric stripes in a liquid crystal layer 605 in a liquid crystal device 600, with different shading representing different pitch length or reflective color of liquid crystals, when in an actively reflecting configuration, in areas 610, 620, and 630. FIG. 6B shows a top or face view of liquid crystal device 600, showing the appearance of bright mark 655 over the black or dark color background due to application of pressure or force to the surface of liquid crystal device 600. Mark 655 is shown in FIG. 6B as having a series of different reflective colors, matching the position of areas 610, 620, and 630 shown in FIG. 6A. Here, three reflective colors may be used, such as red for area 610, green for area 620, and blue for area 630, for example.

Figure 7A:
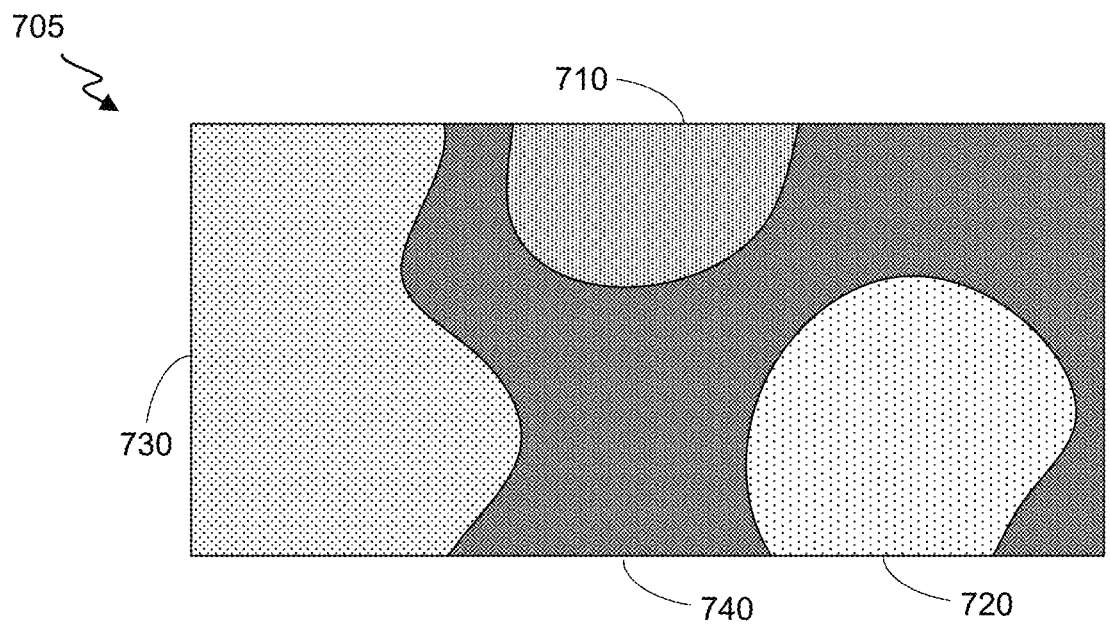
FIG. 7A provides a schematic illustration of an example liquid crystal film having an arbitrary configuration in accordance with some embodiments.
Figure 7B:
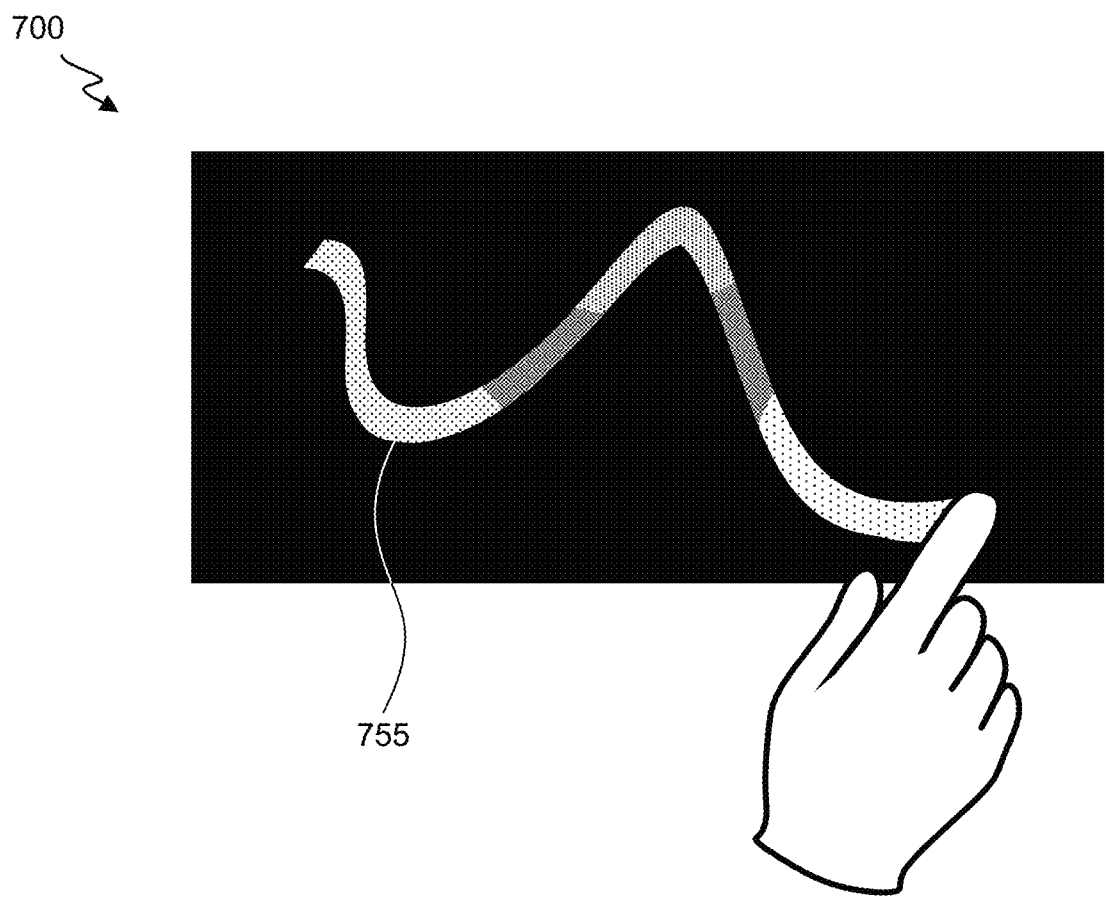
FIG. 7B provides a schematic top or face view of an example four-color liquid crystal device employing the liquid crystal film shown in FIG. 7A.

In one additional example, areas of arbitrary shape may be used. FIG. 7A provides a schematic face or top view of different areas 710, 720, 730, and 740 in a liquid crystal device 700, with different shading representing different pitch length or reflective color of liquid crystals, when in an actively reflecting configuration, in areas 710, 720, 730, and 740. FIG. 7B shows a top or face view of liquid crystal device 700, showing the appearance of bright mark 755 over the black or dark color background due to application of pressure or force to the surface of liquid crystal device 700. Mark 755 is shown in FIG. 7B as having a series of different reflective colors, matching the position of areas 710, 720, 730, and 740 shown in FIG. 7A. Here, four reflective colors may be used, such as orange for area 710, yellow for area 720, purple for area 730, and green for area 740, for example.

Methods of Manufacturing Liquid Crystal Writing Devices

Figure 8:
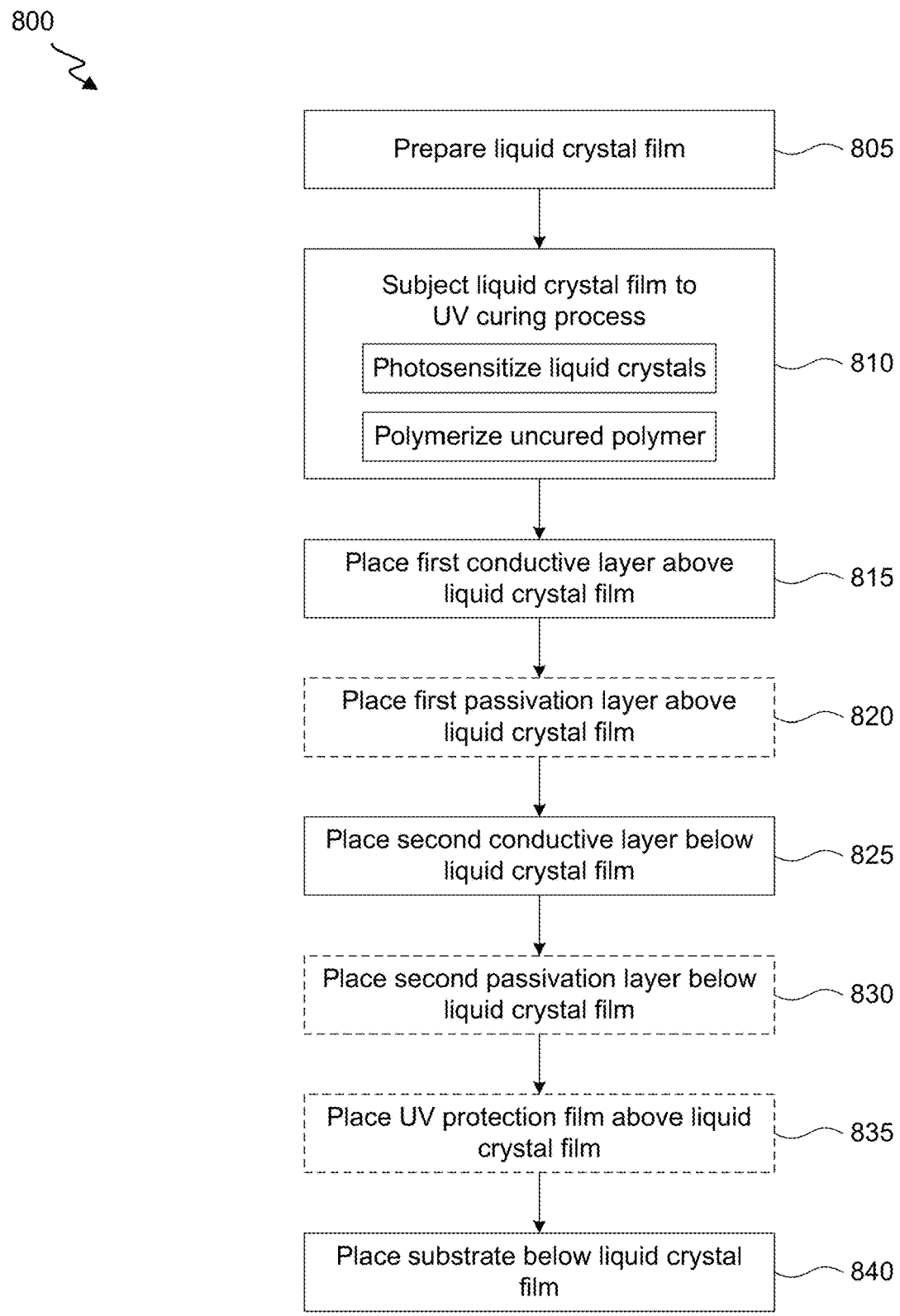
FIG. 8 provides an overview of an example method of manufacturing a liquid crystal device.

FIG. 8 provides an overview of an exemplary method 800 of making a liquid crystal device. At block 805, a liquid crystal film is prepared. Example liquid crystal films include those described herein, which may include an uncured polymer and cholesteric liquid crystals comprising nematic liquid crystals and a photosensitive chiral dopant. Example photosensitive chiral dopants may include, for example, chiral azobenzene dopants that can take on two different isomeric orientations, a cis orientation and a trans orientation.

At block 805, the liquid crystal film is subjected to an ultraviolet (UV) curing process by exposing the liquid crystal film to UV light. The UV curing process may perform several functions, including photosensitizing the liquid crystals to control and/or set a pitch length in the liquid crystals, which allows tuning a reflective wavelength of the liquid crystals, and polymerizing the uncured polymer. The UV curing process may advantageously use multiple UV light exposure regions, which may allow different regions or areas of the liquid crystal film to be subjected to different intensities, wavelengths, and/or durations of UV light exposure. In this way, the photosensitive chiral dopants in the different regions can be subjected to different amounts, intensities, or wavelengths of UV light, allowing for varied control over the concentration of different isomeric orientations of the photosensitive chiral dopant. As noted above, the relative concentrations of different isomeric orientations of the photosensitive chiral dopant can impact the helical twist power and pitch of a cholesteric liquid crystal, which directly impacts the reflective wavelength of a reflecting configuration (e.g., state or orientation) of a cholesteric liquid crystal.

At block 815, a first conductive layer is placed above the liquid crystal film. Optionally, a first passivation layer is also placed above the liquid crystal film, at block 820, such as between the liquid crystal film and the first conductive layer. At block 825, a second conductive layer is placed below the liquid crystal film. Optionally, a second passivation layer is also placed below the liquid crystal film, at block 830, such as between the liquid crystal film and the second conductive layer.

At block 835, a UV protection film may be optionally provided above the liquid crystal film. Use of a UV protection film may be advantageous for limiting the cholesteric liquid crystals to exposure to additional UV light, which could modify the relative concentration of different isomeric orientations of a photosensitive chiral dopant and change the reflective wavelength of the liquid crystal.

At block 840, a substrate is placed below the liquid crystal film, such as below the liquid crystal film, optional second passivation layer, and second conductive layer. The substrate may advantageously exhibit a dark or black color, to provide a contrast with the reflective color of cholesteric liquid crystals in the liquid crystal film when in a reflective configuration or orientation. In some cases, the substrate may be transparent, which may allow for the liquid crystal device to be used as a transparent writing or display device.

It will be appreciated that the order of operations shown in FIG. 8 is not intended to be limiting, but is simply intended to show that different layers may be provided in a liquid crystal device to achieve a particular arrangement of layers within the device. For example, the substrate, second conducting layer, and second passivation film may optionally be assembled first and then the liquid crystal film may be placed above these layers. Alternatively, the UV protection film, first conducting layer, and first passivation film may optionally be assembled first and then the liquid crystal film may be placed below these layers. Further, it will be appreciated that use of the terms "above" and "below" herein are intended to indicate a relative orientation of components and are not intended to limit the absolute orientation of layers in a liquid crystal device. Accordingly, the terms above and below may be substituted for other terms indicating a relative placement of layers, such as the phrases "on a first side" and "on a second side" or "adjacent to a first side" and "adjacent to a second side," for example.

Figure 9:
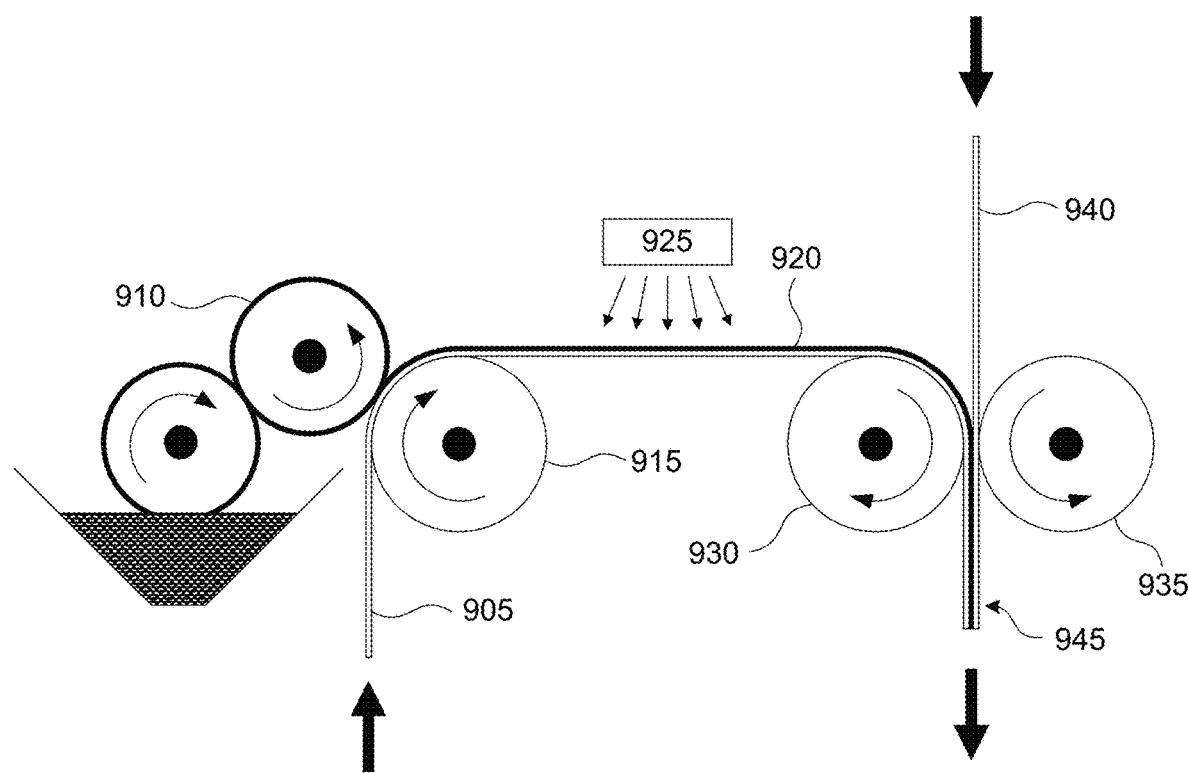
FIG. 9 provides a schematic illustration of an example roll-to-roll processing technique.

FIG. 9 provides a schematic illustration of a roll-to-roll processing technique, useful for manufacturing liquid crystal devices according to the present disclosure. In FIG. 9, a substrate 905 is brought into contact with rollers 910 and 915 for depositing a liquid crystal film 920 over the substrate 905. The substrate 905 may optionally include multiple layers, and may include, for example, a carrier or base layer (e.g., itself a substrate), a conductive layer, a passivation layer, a UV protection film, or the like.

As shown, roller 910 may be in contact with another roller which is immersed in a source of a liquid crystal mixture for roll-to-roll application of the liquid crystal mixture onto substrate 905. Such a configuration is merely intended to be illustrative and is not intended to be limiting. For example, roller 910 may itself optionally be immersed in the source of liquid crystal mixture. Other specific roll coating techniques may be used to apply the liquid crystal mixture to substrate 905, such as use of gravure coaters, reverse coaters, slot die coaters, lip coaters, knife coaters, blade roll coaters, blade coaters, chamber doctor coaters, bar coaters, air knife (air doctor) coaters, or the like. Optionally, a roll-to-roll application process for applying the liquid crystal mixture to the substrate 905 may not be used and another application process may be used instead. For example, a spray coating process may be used, a spin coating process may be used, an inkjet printing process may be used, a screen printing process may be used. Roll-to-roll processing techniques may be advantageous as such a process may allow for quick and efficient formation of large areas of liquid crystal devices.

After the liquid crystal mixture is applied to substrate 905, it is subjected to UV light exposure from a UV light source 925 as part of a UV curing process, where the UV light can polymerize uncured polymer present in the liquid crystal mixture and photosensitize cholesteric liquid crystals present in the liquid crystal mixture. The UV light generated by UV light source 925 can have a spatial variation, which may be useful for photosensitizing the cholesteric liquid crystals in different areas according to different UV exposures, intensities, or wavelengths.

After the UV curing process, the substrate 905 and liquid crystal film 920 may be passed adjacent to or between additional rollers 930 and 935, such as to apply another substrate 940 over liquid crystal film 920 and generate liquid crystal device 945. Substrate 940 may optionally include multiple layers, and may include, for example, a carrier or base layer (e.g., itself a substrate), a conductive layer, a passivation layer, a UV protection film, or the like. Liquid crystal device 945 may be subjected to additional processing steps following attachment of substrate 940.

Figure 10:
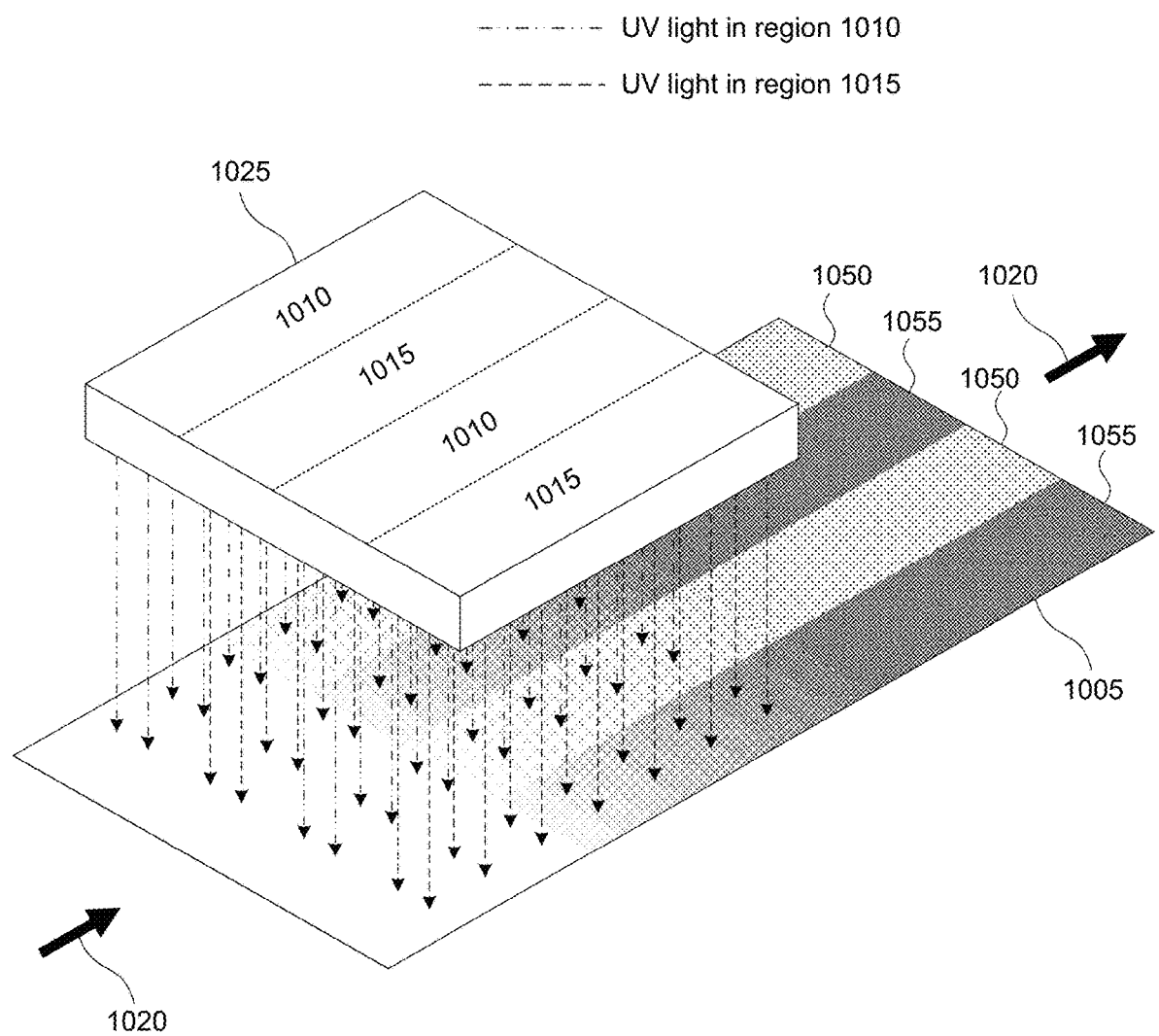
FIG. 10 provides a schematic illustration of an example UV curing process.

FIG. 10 provides a schematic illustration of a UV curing process where different regions of a liquid crystal film 1005 are subjected to different UV light conditions to polymerize uncured polymer in the liquid crystal film 1005 and to photosensitize cholesteric liquid crystals in the liquid crystal film 1005. A UV light source 1025 is positioned above the liquid crystal film and may correspond to UV light source 925 and be positioned in a similar configuration in a roll-to-roll processing scheme as UV light source 925 depicted in FIG. 9, and liquid crystal film 1005 is shown moving along direction 1020. UV light source 1025 is constructed to emit different regions of UV light spatially across the liquid crystal film 1005 as it passes beneath UV light source 1025. As illustrated, two distinct regions of UV light, a first UV light region 1010 and a second UV light region 1015, are emitted by UV light source, arranged in a side-by-side configuration, though any desirable number and arrangement of UV light regions may be implemented and independently exhibit different intensities, wavelengths, and/or exposure durations. As the liquid crystal film 1005 passes beneath UV light source 1025, uncured polymer in the liquid crystal film 1005 is polymerized and cholesteric liquid crystals in the liquid crystal film 1005 are photosensitized. The curing process completes as the liquid crystal film 1005 emerges from beneath UV light source 1025.

The intensities, wavelengths, and/or exposure durations of UV light may differ between first UV light region and second UV light region and allow areas 1050 and 1055 of liquid crystal film 1005 to exhibit different optical properties, such as different reflective wavelengths of the cholesteric liquid crystals when in a reflective configuration or orientation. The resultant liquid crystal device may be similar to liquid crystal device 400 depicted in FIG. 4B or liquid crystal device 500 depicted in FIG. 5B, as both of these devices feature a striped configuration.

In some embodiments, the liquid crystal film 1005 is not moving and may be processed according to a batch process, such as to achieve the liquid crystal device 600 depicted in FIG. 6B or liquid crystal device 600 depicted in FIG. 6B. In such a configuration, rather than side-by-side bands of UV light region, a UV light source can have a spatial variation that matches the desired color pattern of the liquid crystal film (e.g., liquid crystal film 605 or 705). In some embodiments, a uniform UV light source may be used and a UV mask may provide for the spatial variation in light transmitted.

The invention may be further understood by the following non-limiting examples.

Example 1

A liquid crystal film was prepared and had the following components, indicated in weight percent:

HCCH company positive liquid crystal SL-79 (HCCH), about 53.5%;
Chiral dopant S811, about 10.2%;

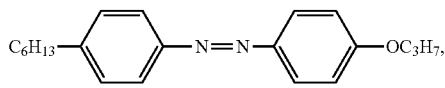

about 4.1%;

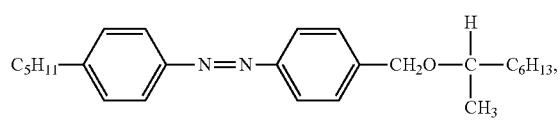

about 11.3%;
Norland NOA65, about 5.3%;
Pentaerythritol triacrylate, about 4.6%;
Shenzhen Guangxinyi Company UV 8003, about 7.8%;
1,10-Bis(acrylyloy)decane, about 2.2%;
IRGACURE 651, about 1.0%.

Three different areas of the liquid crystal film were cured using different UV exposure conditions. Area 1: 365 nm, 3 mW/cm² for about 120 seconds. Area 2: 365 nm, 3 mW/cm² for about 150 seconds. Area 3: 365 nm, 3 mW/cm² for about 170 seconds. The resultant cured liquid crystal film exhibited the following reflective colors when subjected to a pressure or force to modify the alignment of the liquid crystals. Area 1: blue color. Area 2: green color. Area 3: red color.

Example 2

A liquid crystal film was prepared and had the following components, indicated in weight percent:
HCCH company positive liquid crystal SL-79 (HCCH), about 50.5%;
Chiral dopant 5811, about 9.5%;

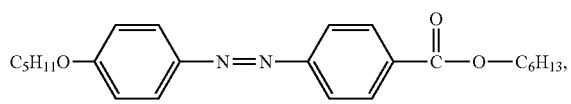

about 4.1%;

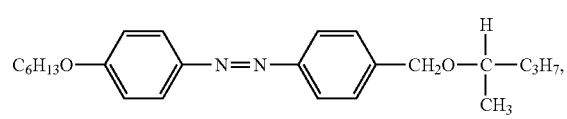

about 15.3%;

Ethoxylated glycerine triacrylate, about 1.8%;
Trimethylolpropane triacrylate, about 2.3%;
Ethoxylated trimethylolpropane triacrylate, about 1.7%;
1,9-Bis(acryloyloxy)nonane, about 1.6%;
Isodecyl methacrylate, about 2.1%;
Shenzhen Guangxinyi Company UV 9001, about 10.1%;
IRGACURE 651, about 1.2%.

Three different areas of the liquid crystal film were cured using different UV exposure conditions. Area 1: 365 nm, 3 mW/cm² for about 120 seconds. Area 2: 365 nm, 5 mW/cm² for about 120 seconds. Area 3: 365 nm, 7 mW/cm² for about 120 seconds. The resultant cured liquid crystal film exhibited the following reflective colors when subjected to a pressure or force to modify the alignment of the liquid crystals. Area 1: blue color. Area 2: green color. Area 3: red color.

Example 3

A liquid crystal film was prepared and had the following components, indicated in weight percent:
HCCH company positive liquid crystal SL-83 (HCCH), about 57.1%;

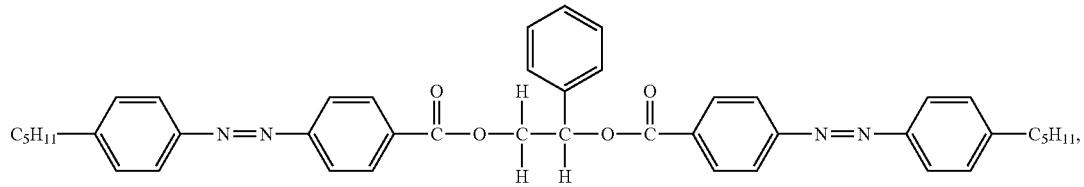

about 23.1%;
Pentaerythritol triacrylate, about 1.5%;
Trimethylolpropane trimethacrylate, about 2.3;
Shenzhen Guangxinyi Company UV 9003, about 5.1%;
Shenzhen Guangxinyi Company UV 8116, about 5.6%;
Shenzhen Guangxinyi Company UV 8006, about 4.2%;
IRGACURE 651, about 1.1%.

Three different areas of the liquid crystal film were cured using different UV exposure conditions. Area 1: 365 nm, 5 mW/cm² for about 120 seconds. Area 2: 355 nm, 5 mW/cm² for about 130 seconds. Area 3: 345 nm, 5 mW/cm² for about 140 seconds. The resultant cured liquid crystal film exhibited the following reflective colors when subjected to a pressure or force to modify the alignment of the liquid crystals. Area 1: blue color. Area 2: green color. Area 3: red color.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Spatial descriptions, such as "above," "below," "up," "left," "right," "down," "top," "bottom," "vertical," "horizontal," "side," "higher," "lower," "upper," "over," "under," and so forth are indicated with respect to the orientation shown in the figures unless otherwise specified and are not intended to be limiting. It should be understood that the spatial description used herein are for purposes of illustration only and that practical implementations of the structures described herein can be spatially arranged in any orientation or manner.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A liquid crystal device comprising:
   a first conductive layer;
   a second conductive layer; and;
   a liquid crystal film between the first conductive layer and the second conductive layer, the liquid crystal film comprising a liquid crystal layer including cholesteric liquid crystals, the cholesteric liquid crystals comprising nematic liquid crystals and a photosensitive chiral dopant, the liquid crystal layer including a first region and a second region, the first region and the second region correspond to transversely separated areas across the liquid crystal layer, wherein:
   the first region corresponds to a first ultraviolet (UV) light exposure region,
   the second region corresponds to a second UV light exposure region,
   the first UV light exposure region and the second UV light exposure region correspond to regions of different UV light exposure across the liquid crystal film,
   the liquid crystals in the first region are photosensitized by UV exposure, based on the first UV light exposure region, to have a first pitch, and
   the liquid crystals in the second region are photosensitized by UV exposure, based on the second UV light exposure region, to have a second pitch that is different from the first pitch.

2. The liquid crystal device of claim 1, wherein a first concentration ratio of different isomers of the photosensitive chiral dopant in the first region is different from a second concentration ratio of different isomers of the photosensitive chiral dopant in the second region.

3. The liquid crystal device of claim 2, wherein the photosensitive chiral dopant comprises a chiral azobenzene dopant, wherein the first concentration ratio and the second concentration ratio correspond to concentration ratios of cis-isomers to trans-isomers of the chiral azobenzene dopant.

4. The liquid crystal device of claim 1, wherein:
   UV light intensities differ between the first UV light exposure region and the second UV light exposure region; or
   UV light wavelengths differ between the first UV light exposure region and the second UV light exposure region; or
   UV light exposure durations differ between the first UV light exposure region and the second UV light exposure region.

5. The liquid crystal device of claim 1, wherein cholesteric liquid crystals in the first region of the liquid crystal layer exhibit a reflective state of a first color, wherein cholesteric liquid crystals in the second region of the liquid crystal layer exhibit a reflective state of a second color, wherein the second color and the first color are different.

6. The liquid crystal device of claim 1, the liquid crystal film further comprising one or more polymer layers, wherein the one or more polymer layers are formed by the UV exposure, to polymerize uncured polymer to form cured polymer.

7. The liquid crystal device of claim 1, the liquid crystal film further comprising a cross-linked polymer network, wherein the cross-linked polymer network is formed from multifunctional monomers subject to the UV exposure.

8. The liquid crystal device of claim 1, the liquid crystal film further comprising another chiral dopant different from the photosensitive chiral dopant.

9. The liquid crystal device of claim 1, wherein the cholesteric liquid crystals in the liquid crystal layer exhibit a reflective state and a scattering state, wherein the reflective state is stable in the absence of an electric field applied between the first conductive layer and the second conductive layer, and wherein the scattering state is stable in the absence of an electric field applied between the first conductive layer and the second conductive layer.

10. The liquid crystal device of claim 1, wherein the cholesteric liquid crystals in a light scattering state in the liquid crystal layer change to a light reflective state in response to applied mechanical pressure.

11. The liquid crystal device of claim 1, wherein the cholesteric liquid crystals in a light reflective state in the liquid crystal layer change to a light scattering state in response to an electric field applied between the first conductive layer and the second conductive layer.

12. The liquid crystal device of claim 1, further comprising:
- a passivation film between the first conductive layer and the liquid crystal layer or between the second conductive layer and the liquid crystal layer; or
- a first passivation film between the first conductive layer and the liquid crystal layer and a second passivation film between the second conductive layer and the liquid crystal layer.

* * * * *